United States Patent
Kirveskoski

(10) Patent No.: US 9,237,593 B2
(45) Date of Patent: Jan. 12, 2016

(54) METHOD AND APPARATUS FOR IMPROVING RECEPTION AVAILABILITY ON MULTI-SUBSCRIBER IDENTITY MODULE DEVICES

(75) Inventor: Miikka Petteri Kirveskoski, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1163 days.

(21) Appl. No.: 13/169,920

(22) Filed: Jun. 27, 2011

(65) Prior Publication Data

US 2012/0327912 A1   Dec. 27, 2012

(51) Int. Cl.
| | |
|---|---|
| H04W 72/04 | (2009.01) |
| H04W 76/02 | (2009.01) |
| H04W 48/08 | (2009.01) |
| H04W 48/18 | (2009.01) |
| H04W 88/06 | (2009.01) |
| H04W 8/18 | (2009.01) |
| H04M 15/00 | (2006.01) |

(52) U.S. Cl.
CPC ........ *H04W 76/025* (2013.01); *H04W 72/0446* (2013.01); *H04M 15/751* (2013.01); *H04M 2215/7209* (2013.01); *H04W 8/183* (2013.01); *H04W 48/08* (2013.01); *H04W 48/18* (2013.01); *H04W 88/06* (2013.01)

(58) Field of Classification Search
CPC ... H04W 48/08; H04W 48/18; H04W 76/025; H04W 88/06; H04W 8/183; H04W 72/0446; H04M 15/751; H04M 2215/7209
USPC .......................... 370/336; 455/434, 436, 558
See application file for complete search history.

(56) References Cited

U.S. PATENT DOCUMENTS

| | | | |
|---|---|---|---|
| 8,494,519 B2 * | 7/2013 | Shi et al. ...................... 455/434 |
| 2003/0125073 A1 * | 7/2003 | Tsai et al. ..................... 455/552 |
| 2006/0052095 A1 * | 3/2006 | Vazvan ................. H04M 15/00 455/420 |
| 2006/0268838 A1 * | 11/2006 | Larsson ............. H04L 63/0807 370/352 |

(Continued)

FOREIGN PATENT DOCUMENTS

KR    10-2011-0036464 A    4/2011

OTHER PUBLICATIONS

Notification of Transmittal of The International Search Report and The Written Opinion of the International Searching Authority, or The Declaration for International Application No. PCT/FI2012/050554, dated Oct. 5, 2012, pp. 1-12.

*Primary Examiner* — Parth Patel
*Assistant Examiner* — Kai Chang
(74) *Attorney, Agent, or Firm* — Ditthavong & Steiner, P.C.

(57) ABSTRACT

An approach is provided for improving reception availability for multi-subscriber identity module (SIM) devices. The approach involves determining network access information for one or more applications resident on a device having two or more subscriber identity modules, wherein the network access information specifies, at least in part, one or more network access schedules, which of the two or more subscriber identity modules to use for establishing one or more network connections for the one or more applications, or a combination thereof. The approach also involves processing and/or facilitating a processing of the network access information to determine a coordinated network access schedule for the one or more applications. The approach further involves determining to use the coordinated network access schedule in place of the one or more network schedules to cause, at least in part, an establishment of the one or more network connections.

20 Claims, 8 Drawing Sheets

(56) References Cited

U.S. PATENT DOCUMENTS

| | | | | |
|---|---|---|---|---|
| 2007/0060200 | A1* | 3/2007 | Boris | H04M 15/30 455/558 |
| 2008/0232334 | A1* | 9/2008 | Das | H04W 48/08 370/337 |
| 2009/0131054 | A1 | 5/2009 | Zhang | |
| 2010/0128699 | A1* | 5/2010 | Yang et al. | 370/335 |
| 2010/0304670 | A1* | 12/2010 | Shuo | H04M 1/7253 455/41.1 |
| 2010/0317374 | A1* | 12/2010 | Alpert et al. | 455/458 |
| 2011/0081951 | A1 | 4/2011 | Hwang | |
| 2011/0267367 | A1* | 11/2011 | Tsai | G06F 9/4443 345/629 |
| 2012/0106533 | A1* | 5/2012 | Chen et al. | 370/342 |
| 2012/0159209 | A1* | 6/2012 | Stemen | G06F 9/4893 713/320 |
| 2012/0314610 | A1* | 12/2012 | Hou | H04W 4/003 370/252 |

* cited by examiner

400

METHOD AND APPARATUS FOR IMPROVING RECEPTION AVAILABILITY ON MULTI-SUBSCRIBER IDENTITY MODULE DEVICES

BACKGROUND

Service providers and device manufacturers (e.g., wireless, cellular, etc.) are continually challenged to deliver value and convenience to consumers by, for example, providing compelling network services. One particular area of interest involves managing activity time for devices having multiple subscriber identity modules (SIM).

SOME EXAMPLE EMBODIMENTS

Therefore, there is a need for an approach for improving reception availability on a multi-SIM device.

According to one embodiment, a method comprises determining network access information for one or more applications resident on a device having two or more subscriber identity modules, wherein the network access information specifies, at least in part, one or more network access schedules, which of the two or more subscriber identity modules to use for establishing one or more network connections for the one or more applications, or a combination thereof. The method also comprises processing and/or facilitating a processing of the network access information to determine a coordinated network access schedule for the one or more applications. The method further comprises determining to use the coordinated network access schedule in place of the one or more network schedules to cause, at least in part, an establishment of the one or more network connections.

According to another embodiment, an apparatus comprises at least one processor, and at least one memory including computer program code, the at least one memory and the computer program code configured to, with the at least one processor, cause, at least in part, the apparatus to determine network access information for one or more applications resident on a device having two or more subscriber identity modules, wherein the network access information specifies, at least in part, one or more network access schedules, which of the two or more subscriber identity modules to use for establishing one or more network connections for the one or more applications, or a combination thereof. The apparatus is also caused to process and/or facilitate a processing of the network access information to determine a coordinated network access schedule for the one or more applications. The apparatus is further caused to process and/or facilitate a processing of the network access information to determine a coordinated network access schedule for the one or more applications.

According to another embodiment, a computer-readable storage medium carries one or more sequences of one or more instructions which, when executed by one or more processors, cause, at least in part, an apparatus to determine network access information for one or more applications resident on a device having two or more subscriber identity modules, wherein the network access information specifies, at least in part, one or more network access schedules, which of the two or more subscriber identity modules to use for establishing one or more network connections for the one or more applications, or a combination thereof. The apparatus is also caused to process and/or facilitate a processing of the network access information to determine a coordinated network access schedule for the one or more applications. The apparatus is further caused to process and/or facilitate a processing of the network access information to determine a coordinated network access schedule for the one or more applications.

According to another embodiment, an apparatus comprises means for determining network access information for one or more applications resident on a device having two or more subscriber identity modules, wherein the network access information specifies, at least in part, one or more network access schedules, which of the two or more subscriber identity modules to use for establishing one or more network connections for the one or more applications, or a combination thereof. The apparatus also comprises means for processing and/or facilitating a processing of the network access information to determine a coordinated network access schedule for the one or more applications. The apparatus further comprises means for processing and/or facilitating a processing of the network access information to determine a coordinated network access schedule for the one or more applications.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-8, 21-28, and 42-44.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for improving reception availability on a multi-SIM device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
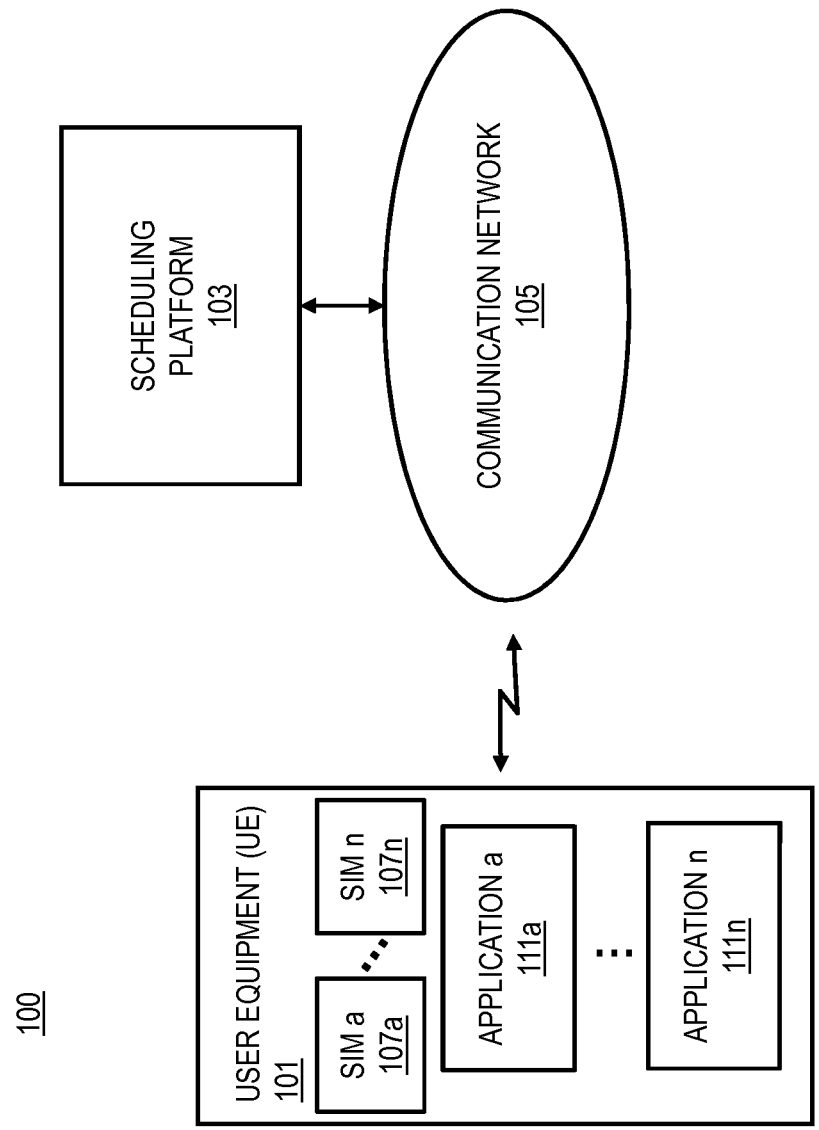
FIG. 1 is a diagram of a system capable of improving reception availability on a multi-SIM device, according to one embodiment.

FIG. 1 is a diagram of a system capable of improving reception availability on a multi-SIM device, according to one embodiment. In multi-SIM devices, such as those with a single RF transmitter, calls may be received by any of the available SIM's when all of the SIM's are in an idle state. But, when data for applications running in the background of a home screen or idle state using one SIM, for example, the SIM not being used is disabled by a scheduling platform. For example, if, in a device having two SIM cards SIM #1 and SIM #2, SIM #1 is used for GPRS, then SIM #2 "is out of reach," or in other words, unable to receive calls or data communications. This happens when a foreground application or a background application is sending or receiving data. Some applications may require connectivity of a particular SIM to a network for access to the network, or the application may not be SIM specific, and may access the network using any available SIM. Also, various SIM's may use any network protocol available for connecting to the network to send and receive data and/or calls.

When a user interfaces with a foreground application that accesses a network using SIM #1, the user may be able to recognize and control when SIM #2 will be "out of reach." However, when a background application is running, the user does not have any control or indication over when SIM #1 is used and when SIM #2 goes "out of reach," for example. This lack of control is a primary reason why background SIM #1 is conventionally blocked by a scheduling platform as default in Dual SIM v1.x devices.

There is a need, therefore, to enable data connectivity for "background applications," widgets (i.e. small applications) accessible via a home screen, or any other application so that the applications may automatically keep themselves updated while maintaining a maximum allowable idle time so that an incoming call or data transfer is not missed for any of the available SIM's.

To address this problem, a system 100 of FIG. 1 introduces the capability to improve reception availability on a multi-SIM user equipment (UE) 101. In embodiments, limiting the time when there is ongoing data activity on any of the multiple SIM's 107a-107n minimizes the chance of missing incoming phone calls or data transfers to the non-active (not in data use) SIM of a UE 101. A scheduling platform 103 limits the network accessing of runtime based individual applications 111a-111n. Such limitation of accessibility improves the chances for receiving phone calls, improves standby times, and allows for more controllable costs for a user of the device.

There can be several applications 111a-111n needing connectivity, making those (with same connectivity settings) access the network concurrently will minimize the time needed to keep a context and data channel active using one SIM 107a and consequently jeopardize missing phone calls over another SIM 107n. Further, minimizing a context up-time will decrease battery-consumption—consequently giving the UE 101 more standby time without charging. Also, as applications are enabled to use data only at certain times (and prevented at the other times), the user is in better control of the applications data usage thus being able to control any costs associated with data usage.

In embodiments, the user may be able to define the frequency of an application's allowable network access. Such control may dictate more frequent polling times for network connectivity as multiples of previous polling times, e.g. 15 minutes, 30 minutes, 45 minutes, 60 minutes and so on. An application 111a-111n, when selected for allowable network access by scheduling, will be assigned to a "network usage slot" with the other applications 111a-111n. The first scheduling time is therefore potentially earlier or later (depending on final implementation) than the given exact frequency—subsequent accesses shall be with the given frequency time. Depending on memory sufficiency, the applications 111a-111n may access the network at the same time, rather than access the network individually.

As shown in FIG. 1, the system 100 comprises a user equipment (UE) 101 having connectivity to a scheduling platform 103 via a communication network 105. The scheduling platform 103 may be resident on the UE 101 or as a stand-alone platform resident on another device or server, for example. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101 and the scheduling platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
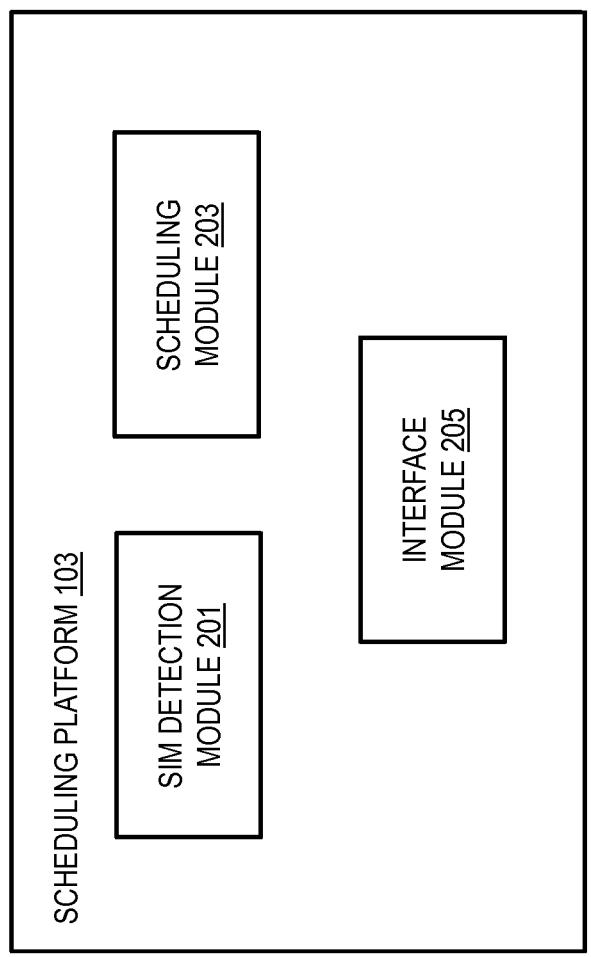
FIG. 2 is a diagram of the components of a scheduling platform for improving reception availability on a multi-SIM device, according to one embodiment.

FIG. 2 is a diagram of the components of scheduling platform 103, according to one embodiment. By way of example, the scheduling platform 103 includes one or more components for providing improving reception availability on multi-SIM devices. It is contemplated that the functions of these components may be combined in one or more components or performed by other components of equivalent functionality. In this embodiment, the scheduling platform 103 includes a SIM detection module 201, a scheduling module 203 and an interface module 205.

In embodiments, the SIM detection module 201 causes an application to run to determine the presence of two or more SIM's resident on the UE 101. If more than one SIM is detected, the scheduling module 203 determines network access information for one or more applications 111a-111n resident on the UE 101 having two or more SIM's 107a-107n. The network access information specifies, at least in part, one or more network access schedules, and/or which of the two or more subscriber identity modules to use for establishing one or more network connections for the one or more applications. Each application may have its own network access schedule, but if each application accesses the network whenever the application wants to do so, it is possible that one of the SIM's of the UE 101 will always be active, and therefore, there will be an insufficient amount of idle time for all of the SIM's, which could result in an increased likelihood of missing a call or a data transfer to an out of reach SIM when one of the SIM's is in use. It should be noted that the scheduling module 203 may also determine network access information for one or more applications 111a-111n resident on the UE 101 when the UE 101 has only one SIM 107a. Such management of network access for the one or more applications 111a-111n may increase battery performance of the UE 101 because of better managed network uptime, rather than each application of the one or more application 111a-111n governing their own connectivity times.

The network access schedules may be, for example, a schedule for polling whether an application of applications 111a-111n needs to be updated, or if the application requires a network connection for any functionality such as sending and/or receiving messages, data, photos, etc. The scheduling platform 103 processes the network access information to determine a coordinated network schedule for the one or more applications 111a-111n.

The coordinated network schedule, for example, may be a scheduling of when the applications are allowed to access the network. By coordinating the network access schedule for each of the applications, the time that all of the SIM's that are detected on the mobile device are in an idle state and able to receive a call or data transfer may be maximized. The scheduling module 203 also causes the UE 101 to use the coordinated network access schedule in place of any network access schedules that are assigned for the specific applications 111a-111n so that the applications 111a-111n are allowed to access the network at the most opportune times. The scheduling module 203 may also group applications together to coordinate their allowable network access times to maximize the amount of SIM idle time in a predetermined period of time. For example, the scheduling module 203 may group three applications together that require SIM 107a for network access, but one of the applications requires network access more often than the other two. So, the scheduling module 203 determines that the group of three applications is allowed network access at a particular time for a particular duration, but then allows the one application that requires more network access occurrences to access the network alone at a later time.

The interface module 205 enables a user to set the network access schedule in any manner the user desires, which may be a different schedule than the coordinated network access schedule determined by the scheduling module 203. The interface module 205 interacts with the scheduling module 203 to override the determined coordinated network schedule where necessary.

Figure 3:
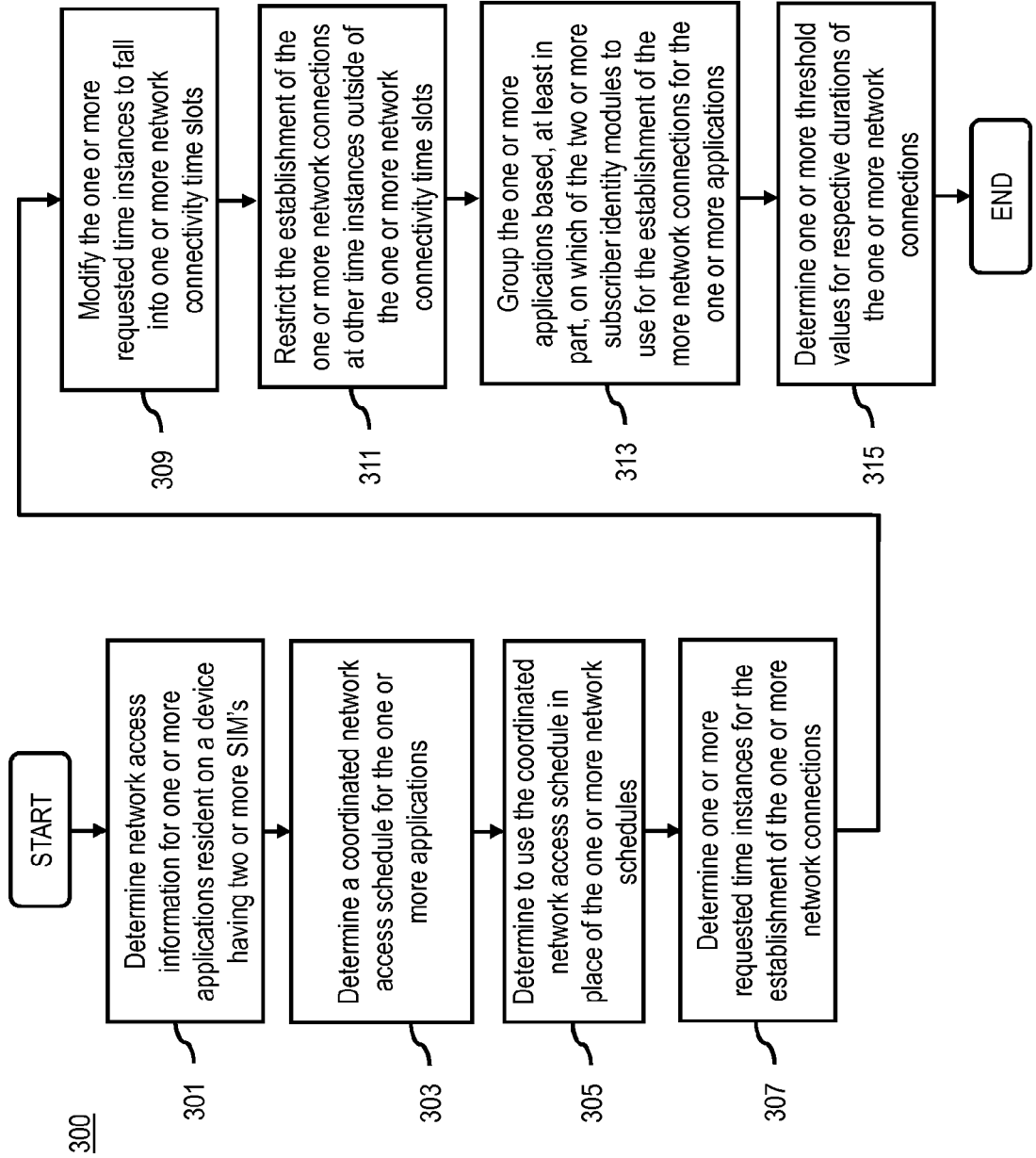
FIG. 3 is a flowchart of a process for improving reception availability on multi-SIM devices, according to one embodiment.
Figure 7:
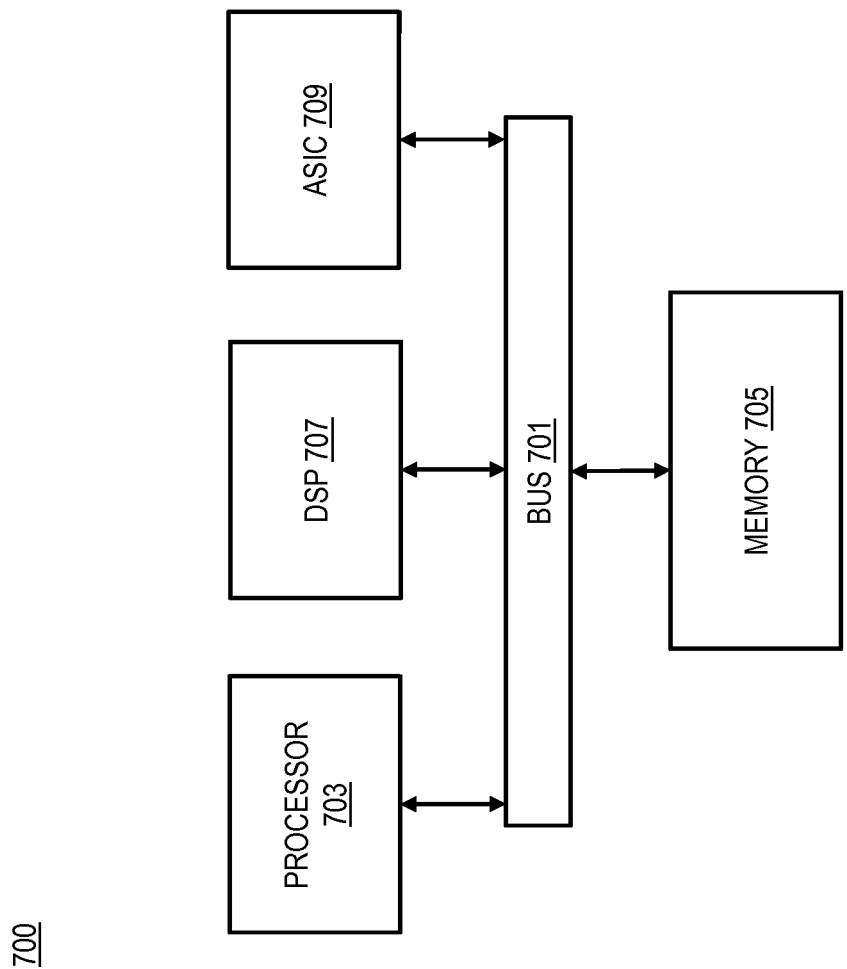
FIG. 7 is a diagram of a chip set that can be used to implement an embodiment of the invention.

FIG. 3 is a flowchart of a process for improving reception availability on multi-SIM devices, according to one embodiment. In one embodiment, the scheduling platform 103 performs the process 300 and is implemented in, for instance, a chip set including a processor and a memory as shown in FIG. 7. In step 301, the scheduling platform 103 determines network access information for one or more applications that are resident on a device having two or more SIM's. The process continues to step 303 in which the scheduling platform 103 determines a coordinated network access schedule for the one or more applications. Then, in step 305, the scheduling platform 103 determines to use the coordinated network access schedule in place of the one or more network schedules. In other words, each of the applications has its own network access schedules, but it would not necessarily be ideal for each of the applications to operate independently. If all of the applications were to operate independently, the amount of time that each of the SIM's would be available to receive a call or a data transmission would not be at its maximum.

Next, in step 307, the scheduling platform 103 determines one or more requested time instances for the establishment of the one or more network connections, and in step 309 modifies the one or more requested time instances to fall into one or more network connectivity time slots. The one or more requested time instances may be determined by processing the network access information and/or the one or more network access schedules. The process continues to step 311 in which the scheduling platform 103 restricts the establishment of one or more network connections at other time instances outside of the one or more network connectivity time slots. Next, in step 313, the scheduling platform 103 optionally groups the one or more applications based on which of the two or more SIM's to use for the establishment of the one or more network connections for the one or more applications. Then, in step 315, the scheduling platform 103 determines one or more threshold values for respective durations of the one or more network connections. For example, certain applications may require a particular network connectivity time to complete a task, while other applications may require a different period of time. In any given time period, it may be advantageous to allow only certain windows of opportunity, or thresholds, during which an application may access the network. By setting these thresholds, the scheduling platform 103 may determine which applications should be grouped to best utilize the threshold time periods, for example 30 seconds every 10 minutes, for accessibility within a given period of time, such as an hour.

Figure 4:
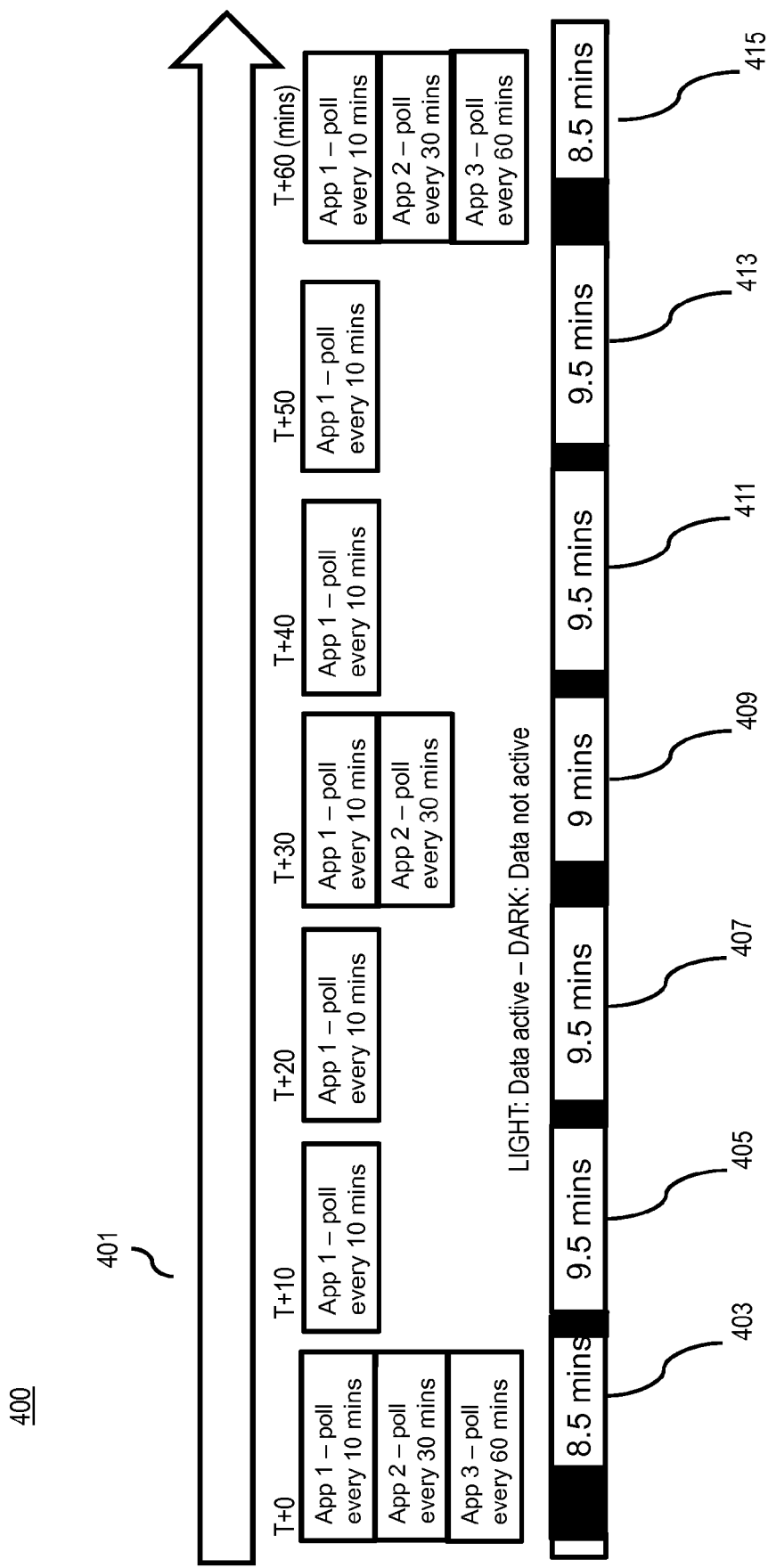
FIG. 4 is a diagram of a coordinated schedule, according to one embodiment.

FIG. 4 is a diagram of an example coordinated network access schedule 401, according to one embodiment. In this example, there are three applications, App 1, App 2, and App 3. Each of the applications 1, 2 and 3 require 0.5 minutes for network access at to complete a task. App 1 requires network access every 10 minutes, App 2 requires network access every 30 minutes and App 3 requires network access every 60 minutes. The scheduling platform 103 determines how best to group the applications to maximize the amount of time during which the SIM's that are needed are not active (i.e. transferring data) so that a call on the other of the SIM's that is not being used may have an opportunity to receive a call or a data transfer. In this example, the scheduling platform groups Apps 1-3 together to allow network access during the first 1.5 minutes of a first 10 minute partition 403, then allows App 1 to have network access for 0.5 minutes at the beginning of each of the next 10 minute partitions 405, 407, then Apps 1 and 2 have network access for 1 minute at the beginning of the next 10 minute partition 409, then App 1 is allowed to have network access for 0.5 minutes at the beginning of each of the next 10 minute partitions 411, 413, then Apps 1-3 are allowed network access at the beginning of the last example 10 minute partition 415. Time, of course, may continue, and the example schedule may continue for an infinite period of time. But, the schedule may be limited by any particular thresholds within any predetermined period of time within which the amount of network access time may be restricted to a limited amount to ensure a maximum period of activity time for each of the SIM's in the device, such as a limitation on an amount of allowable network access time in a give 60 minute segment of time, or a 30 minute segment of time, etc.

In embodiments, applications 111*a*-111*n* may share "network up" time and be kept off for the rest of the time provided there are no "always-online" types of applications. As discussed above, multiple apps may be allowed to have network access concurrently so long as memory, processing capabilities, power, network settings and the like allow for such an arrangement, or, also as discussed above, the applications may be chained one after another to accomplish their network accessibility.

Figure 5:
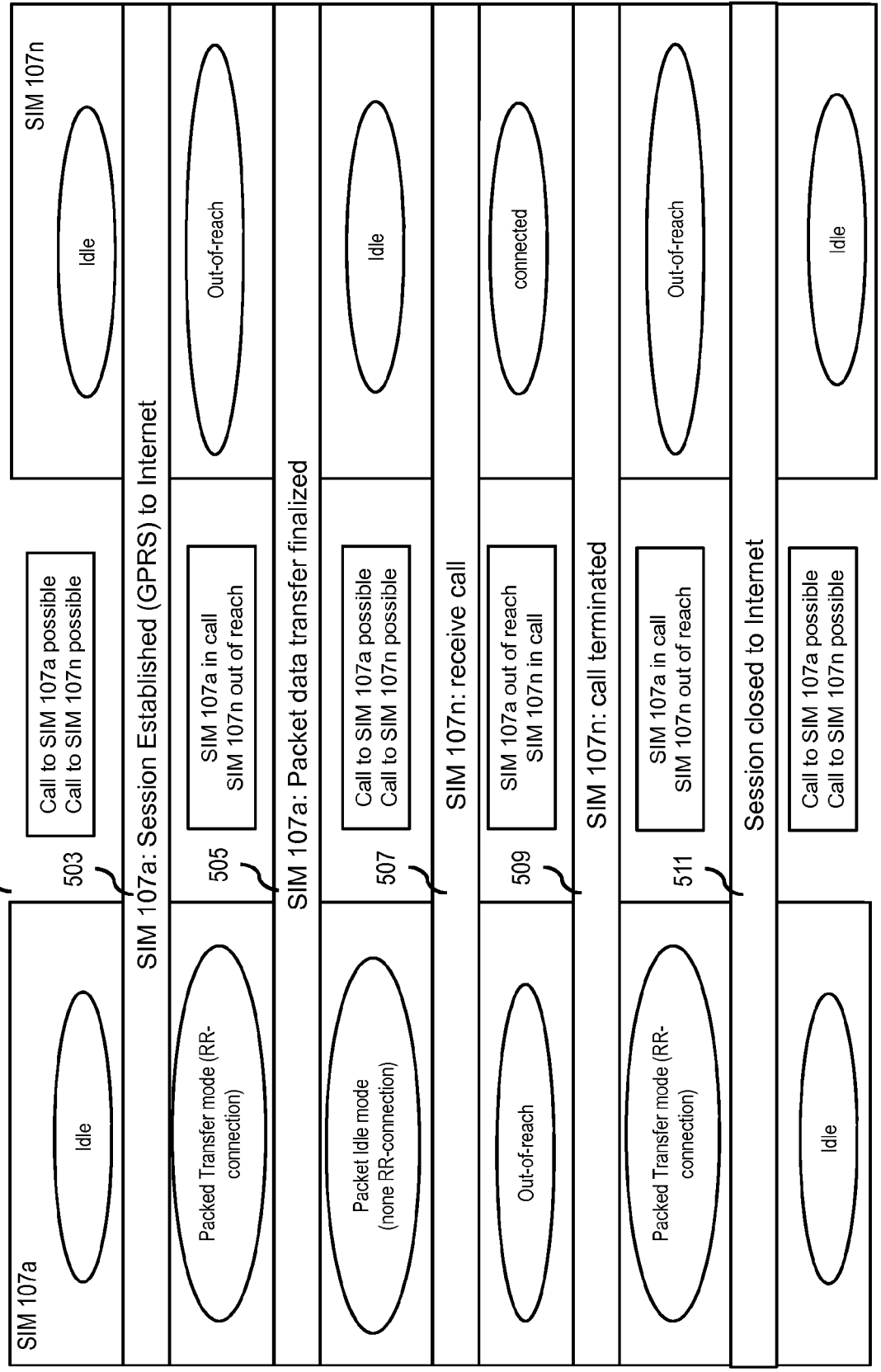
FIG. 5 is a diagram illustrating how a multi-SIM device might operate, according to one embodiment.

FIG. 5 is an illustration of how two SIM's, SIM 107*a* and SIM 107*n* coexist in a device. At 501, both SIM 107*a* and SIM 107*n* are in an idle state. A call to either of the SIM's is possible because nether SIM is active. At 503, SIM 107*a* is accessing the network, and therefore, SIM 107*n* is out-of-reach, or cannot receive a call or a data transfer because SIM 107*a* is active. At 505, SIM 107*a* is returning to an idle mode, and therefore both SIM 107*a* and 107*n* can receive calls and data transmissions. At 507 SIM 107*n* receives a call, and therefore, SIM 107*a* is out-of-reach, and therefore cannot receive a call or a data transfer. At 509, the call to SIM 107*n* is terminated, and SIM 107*a*, therefore, may be able to receive a call. At 511, both 107*a* and 107*n* are in an idle state and able to receive a call or a data transfer.

The processes described herein for improving reception availability on multi-SIM devices may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
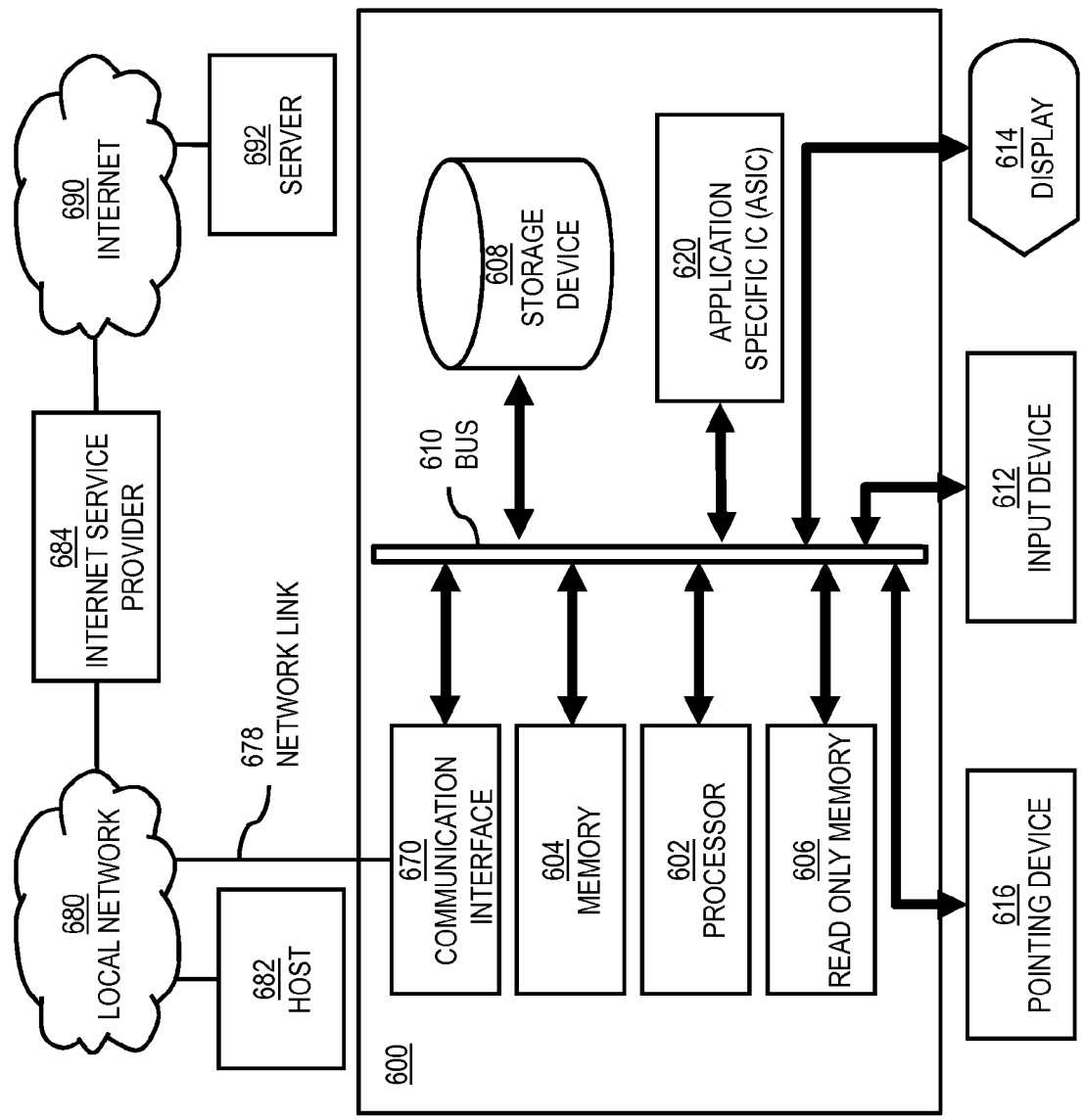
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to improving reception availability on multi-SIM devices as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of improving reception availability on multi-SIM devices.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to improving reception availability on multi-SIM devices. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for improving reception availability on multi-SIM devices. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for improving reception availability on multi-SIM devices, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for improving reception availability on multi-SIM devices to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to improving reception availability on multi-SIM devices as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of improving reception availability on multi-SIM devices.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to perform specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to improving reception availability on multi-SIM devices. The memory 705 also stores the data associated with or generated by the execution of the inventive steps.

Figure 8:
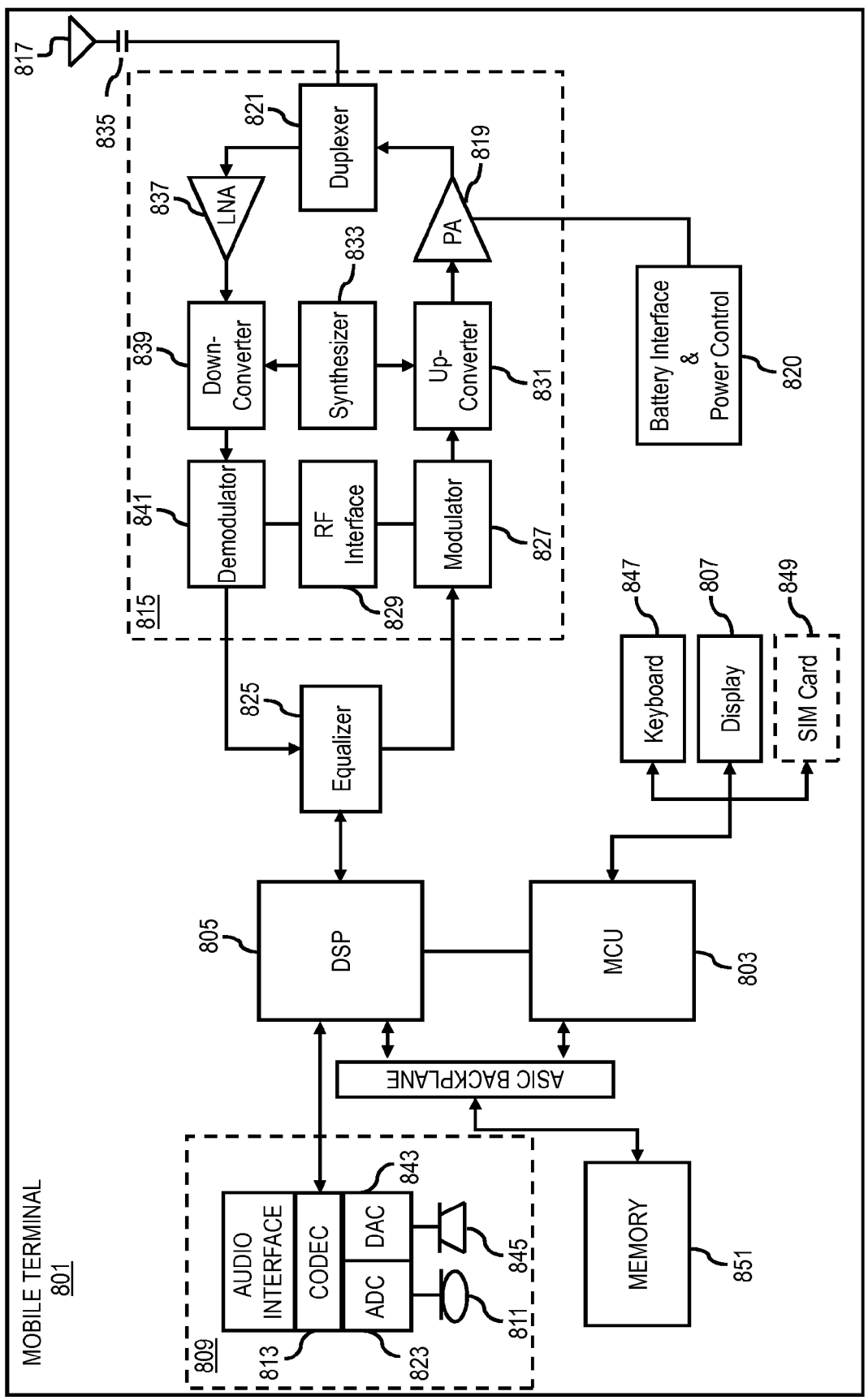
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of improving reception availability on multi-SIM devices. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of improving reception availability on multi-SIM devices. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to improving reception availability on multi-SIM devices. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining network access information, by a processor of a user device, for applications resident on the user device having subscriber identity modules, wherein the network access information specifies, at least in part, network access schedules, which of the subscriber identity modules to use for establishing network connections for the applications, and the applications include one or more call applications and one or more data applications accessible via a home screen of the user device;
   causing, at least in part, a maximization of a total amount of subscriber identity module idle time in a predetermined period of time via a grouping of the applications, by the processor, based, at least in part, on network access frequencies required by the applications using either of the subscriber identity modules for the establishment of the network connections;
   processing the network access information and the grouping, by processor, to determine a coordinated network access schedule of network connectivity time slots for the applications to establish the network connections; and
   causing, at least in part, a usage of the coordinated network access schedule in place of the network schedules, by the processor, to cause, at least in part, an establishment of the network connections including at least one data network connection transferring data packets.

2. A method of claim 1, further comprising:
   processing the network access information, the network access schedules, or a combination thereof to determine one or more requested time instances for the establishment of the network connections;
   causing, at least in part, a modification of the one or more requested time instances to fall into the one or more network connectivity time slots, wherein the modification includes maximizing a number of requested time instances concurrently falling into one or more of the network connectivity time slots as supported by available network access resources; and
   determining one or more schedules for polling respective one or more of the applications regarding whether the respective applications require the network connections, wherein the applications include one or more applications handling messages, data, media content, or a combination thereof, exchanged among the user device and one or more other user devices,
   wherein the coordinated network access schedule is based, at least in part, the one or more network connectivity time slots.

3. A method of claim 2, further comprising:
   causing, at least in part, a restriction of the establishment of the network connections at other time instances outside of the one or more network connectivity time slots.

4. A method of claim 1, wherein the coordinated access schedule minimizes a network uptime made of the one or more network connectivity time slots, and the method further comprising:
   determining the network access information, the grouping, the processing of the network access information and the grouping, and the determination to use the coordinated network access is performed by a scheduling platform connected to the user device via a communication network.

5. A method of claim 1, wherein the coordinated network access schedule is based, at least in part, on resource information of the device, and wherein the resource information includes, at least in part, memory resource information, processing resource information, power resource information, network resource information, or a combination thereof.

6. A method of claim 1, further comprising:
determining one or more threshold values for respective durations of the network connections,
wherein the coordinated network access schedule is based, at least in part, on the one or more threshold values.

7. A method of claim 1, wherein the one or more data applications include one or more background applications, one or more widgets, or a combination thereof, wherein at least one of the subscriber identity modules is configured to operate on a general packet radio service network, and wherein one or more of the network connections are established for updating the one or more applications based, at least in part, on one or more of the network access schedules.

8. A method of claim 1, wherein the device comprises a single transmitter module, and wherein the one or more data applications transmit or receive one or more user messages, one or more photos, or a combination thereof.

9. An apparatus comprising:
at least one processor; and
at least one memory including computer program code for one or more programs,
the at least one memory and the computer program code configured to, with the at least one processor, cause the apparatus embedded in a user device to perform at least the following,
determine network access information for applications resident on the user device having subscriber identity modules, wherein the network access information specifies, at least in part, network access schedules, which of the subscriber identity modules to use for establishing network connections for the applications, and the applications include one or more call applications and one or more data applications accessible via a home screen of the user device;
cause, at least in part, a maximization of a total amount of subscriber identity module idle time in a predetermined period of time via a grouping of the applications based, at least in part, on network access frequencies required by the applications using either of the subscriber identity modules for the establishment of the network connections;
process the network access information and the grouping to determine a coordinated network access schedule of network connectivity time slots for the applications to establish the network connections; and
cause, at least in part, a usage of the coordinated network access schedule in place of the network schedules to cause, at least in part, an establishment of the network connections including at least one data network connection transferring data packets.

10. An apparatus of claim 9, wherein the apparatus is further caused to:
process the network access information, the network access schedules, or a combination thereof to determine one or more requested time instances for the establishment of the network connections;
cause, at least in part, a modification of the one or more requested time instances to fall into one or more network connectivity time slots,
wherein the coordinated network access schedule is based, at least in part, the one or more network connectivity time slots.

11. An apparatus of claim 10, wherein the apparatus is further caused to:
cause, at least in part, a restriction of the establishment of the network connections at other time instances outside of the one or more network connectivity time slots.

12. An apparatus of claim 9, wherein the apparatus is further caused to:
cause, at least in part, a grouping of the applications based, at least in part, on which of the subscriber identity modules to use for the establishment of the network connections for the applications,
wherein the coordinated access schedule is based, at least in part, on the grouping.

13. An apparatus of claim 9, wherein the coordinated network access schedule is based, at least in part, on resource information of the device, and wherein the resource information includes, at least in part, memory resource information, processing resource information, power resource information, network resource information, or a combination thereof.

14. An apparatus of claim 9, wherein the apparatus is further caused to:
determine one or more threshold values for respective durations of the network connections,
wherein the coordinated network access schedule is based, at least in part, on the one or more threshold values.

15. An apparatus of claim 9, wherein at least one of the subscriber identity modules is configured to operate on a general packet radio service network.

16. An apparatus of claim 9, wherein the device comprises a single transmitter module.

17. A non-transitory computer-readable storage medium carrying one or more sequences of one or more instructions which, when executed by one or more processors, cause an apparatus embedded in a user device to at least perform the following steps:
determining network access information for applications resident on the user device having subscriber identity modules, wherein the network access information specifies, at least in part, network access schedules, which of the subscriber identity modules to use for establishing network connections for the applications, and the applications include one or more call applications and one or more data applications accessible via a home screen of the user device;
causing, at least in part, a maximization of a total amount of subscriber identity module idle time in a predetermined period of time via a grouping of the applications based, at least in part, on network access frequencies required by the applications using either of the subscriber identity modules for the establishment of the network connections;
processing the network access information and the grouping to determine a coordinated network access schedule of network connectivity time slots for the applications to establish the network connections; and
causing, at least in part, a usage of the coordinated network access schedule in place of the network schedules to cause, at least in part, an establishment of the network connections including at least one data network connection transferring data packets.

18. A non-transitory computer-readable storage medium of claim 17, wherein the apparatus is caused to further perform:
processing the network access information, the network access schedules, or a combination thereof to determine one or more requested time instances for the establishment of the network connections;
causing, at least in part, a modification of the one or more requested time instances to fall into one or more network connectivity time slots, wherein the coordinated network access schedule is based, at least in part, the one or more network connectivity time slots.

19. A non-transitory computer-readable storage medium of claim 18, wherein the apparatus is caused to further perform:
causing, at least in part, a restriction of the establishment of the network connections at other time instances outside of the one or more network connectivity time slots.

20. A non-transitory computer readable storage medium of claim 17, wherein the apparatus is caused to further perform:
causing, at least in part, a grouping of the applications based, at least in part, on which of the subscriber identity modules to use for the establishment of the network connections for the applications,
wherein the coordinated access schedule is based, at least in part, on the grouping.

* * * * *